(12) United States Patent
Huf et al.

(10) Patent No.: US 11,685,297 B2
(45) Date of Patent: Jun. 27, 2023

(54) VEHICLE SEAT CONSOLE

(71) Applicant: Bayerische Motoren Werke Aktiengesellschaft, Munich (DE)

(72) Inventors: Andreas Huf, Neusaess (DE); Klaus Hufnagl, Munich (DE); Sylvia Kleindl, Munich (DE); Fabian Koehler, Valley (DE); Robert Martin, Munich (DE); Robert Painer, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 582 days.

(21) Appl. No.: 16/799,166

(22) Filed: Feb. 24, 2020

(65) Prior Publication Data

US 2020/0189427 A1  Jun. 18, 2020

Related U.S. Application Data

(63) Continuation of application No. PCT/EP2018/073049, filed on Aug. 27, 2018.

(30) Foreign Application Priority Data

Aug. 25, 2017 (DE) .................... 10 2017 214 926.4

(51) Int. Cl.
*B60N 2/42* (2006.01)
*B60N 2/427* (2006.01)
*B60N 2/07* (2006.01)

(52) U.S. Cl.
CPC ....... *B60N 2/42709* (2013.01); *B60N 2/0732* (2013.01); *B60N 2/4214* (2013.01);
(Continued)

(58) Field of Classification Search
CPC ............... B60N 2/4221; B60N 2/4228; B60N 2/42709; B60N 2/0732; B60N 2/4214; B60N 2/42736
See application file for complete search history.

(56) References Cited

U.S. PATENT DOCUMENTS

| 4,232,895 A | 11/1980 | Yoshio et al. | |
| 6,669,288 B2 * | 12/2003 | Nakagawa | ............. B60N 2/286 |
| | | | 297/256.16 |

(Continued)

FOREIGN PATENT DOCUMENTS

| CN | 101863238 A | 10/2010 |
| CN | 102438859 A | 5/2012 |

(Continued)

OTHER PUBLICATIONS

Chinese-language Office Action issued in Chinese Application No. 201880052121.7 dated Sep. 3, 2021 with English translation (17 pages).

(Continued)

*Primary Examiner* — Syed A Islam
(74) *Attorney, Agent, or Firm* — Crowell & Moring LLP (57) ABSTRACT

A vehicle seat console includes at least one vehicle-side guide element and at least one seat-side guide element arranged parallel to the vehicle-side guide element. A length-adjustment device, which is acted on by a drive device and which is designed to bring about a relative displacement between the vehicle-side guide element and the seat-side guide element, is designed such that the length-adjustment device is provided between the seat-side guide element and a force-limiting apparatus, which is in turn coupled to the vehicle-side guide element.

8 Claims, 7 Drawing Sheets

(52) U.S. Cl.
CPC ........ *B60N 2/42736* (2013.01); *B60N 2/4221* (2013.01); *B60N 2/4228* (2013.01)

(56) References Cited

U.S. PATENT DOCUMENTS

| | | | | |
|---|---|---|---|---|
| 2003/0218369 | A1* | 11/2003 | Akaike | B60N 2/1625 |
| | | | | 297/344.15 |
| 2004/0183344 | A1* | 9/2004 | Glance | B60N 2/42709 |
| | | | | 297/216.1 |
| 2009/0160228 | A1* | 6/2009 | Houston | B60N 2/4279 |
| | | | | 297/216.2 |
| 2016/0144752 | A1 | 5/2016 | Frank et al. | |

FOREIGN PATENT DOCUMENTS

| | | |
|---|---|---|
| CN | 105620321 A | 6/2016 |
| DE | 103 53 245 A1 | 6/2005 |
| DE | 10 2008 025 135 A1 | 12/2009 |
| WO | WO 2006/021749 A1 | 3/2006 |
| WO | WO 2006/068567 A1 | 6/2006 |

OTHER PUBLICATIONS

International Search Report (PCT/ISA/210) issued in PCT Application No. PCT/EP2018/073049 dated Nov. 27, 2018 with English translation (five (5) pages).

German-language Written Opinion (PCT/ISA/237) issued in PCT Application No. PCT/EP2018/073049 dated Nov. 27, 2018 (10 pages).

German-language Search Report issued in counterpart German Application No. 10 2017 214 926.4 dated Jul. 6, 2018 with partial English translation (12 pages).

* cited by examiner

VEHICLE SEAT CONSOLE

CROSS REFERENCE TO RELATED APPLICATIONS

This application is a continuation of PCT International Application No. PCT/EP2018/073049, filed Aug. 27, 2018, which claims priority under 35 U.S.C. § 119 from German Patent Application No. 10 2017 214 926.4, filed Aug. 25, 2017, the entire disclosures of which are herein expressly incorporated by reference.

BACKGROUND AND SUMMARY OF THE INVENTION

The invention relates to a vehicle seat console. The invention further relates to a vehicle seat having such a vehicle seat console, and to a motor vehicle having at least one such vehicle seat.

Belt systems and airbags have for decades been recognized as systems for protecting the occupants of motor vehicles. They reduce the loads to which the occupants of a vehicle are subjected in the event of a vehicle collision, in most cases only in defined, upright sitting positions. However, particularly in the context of fully automated driving, reclining positions are becoming more and more important, and therefore adequate protection for the occupants of a vehicle also has to be ensured in such reclining positions. However, in the event of a vehicle collision, the known systems for protecting the occupants of a vehicle cannot sufficiently reduce the loads to which the occupants are subjected when they are in a reclining or semi-reclining position. There is therefore a need for the protection systems to be further developed so that, in a vehicle collision, the acceleration of the body of an occupant of the vehicle, even when in a reclining or semi-reclining position, is limited to a defined level. To this end, a relative displaceability between the vehicle seat and the vehicle chassis can be provided to damp the kinetic energy. If, for the purpose of adjusting the seat length, the vehicle seat console is provided with a longitudinal adjustment device which is self-locking, for example with a spindle drive, the self-locking first of all has to be canceled in order to permit the relative displaceability, i.e. a decoupling has to take place in the longitudinal adjustment device. This requires a complex construction, with additional expenditure on sensors.

DE 10 353 245 A1 discloses a longitudinal adjustment device for a vehicle seat, in which a force-limiting device is provided between the seat-mounted guide device and a spindle in engagement with a vehicle-mounted spindle shaft. The force-limiting device is compressed in the event of an overload and thus is deformed as it takes up kinetic energy. The trigger force required for initiating such material compression is considerable and may possibly be undesirably high for a person located in a resting or reclining position on the seat.

It is the object of the present invention to provide a vehicle seat console of the generic type which is designed such that, in the event of a vehicle collision, the loads to which the body of a person sitting on the vehicle seat is subjected are reliably limited to a sufficient extent, even if this person is in a reclining or semi-reclining position, without the need for costly sensors for deactivating the self-locking of the longitudinal adjustment device.

In a first embodiment, a vehicle seat console having at least one vehicle-mounted guide element and at least one seat-mounted guide element, which is arranged parallel to the vehicle-mounted guide element, and at least one longitudinal adjustment device, which is activated by a drive device and is configured to effect a relative adjustment between the vehicle-mounted guide element and the seat-mounted guide element, is characterized in that the longitudinal adjustment device is provided between the seat-mounted guide element and a force-limiting device, which has a force-limiting element coupled on the one hand to the longitudinal adjustment device and on the other hand to the vehicle-mounted guide element. The force-limiting element has a deformation portion which deforms when acted upon by a force above a predefined force threshold value and which has a through-opening with a slit originating therefrom and extending in the longitudinal direction of the force-limiting device. The force-limiting element moreover has a displacement body, which extends through the through-opening and whose thickness is greater than the width of the slit.

It is true for all embodiments that the longitudinal adjustment of the vehicle seat takes place, in a manner known per se, with a self-locking longitudinal adjustment device, by which the vehicle seat is adjusted in the longitudinal direction of the vehicle. This device thus mounts the vehicle seat in a movable manner relative to the vehicle structure. In the event of a collision, the vehicle seat with the occupant on it seeks, on account of its mass inertia, to carry on moving counter to the collision force acting on the vehicle structure. However, since the longitudinal adjustment device is provided between the seat-mounted guide element and a force-limiting device which is in turn coupled to the vehicle-mounted guide element, the force-limiting device forms the required degree of freedom that is needed for the required relative movement between the vehicle-mounted guide element and the seat-mounted guide element, since the force-limiting device is stiff and immovable below a predefined force threshold value in the longitudinal direction, i.e. in the direction of the required relative movement, and since, above the predefined force threshold value, it permits a relative movement in which kinetic energy is reduced. The force-limiting device consuming the kinetic energy is triggered by the forces that arise from the occupants, belt system and seat in the event of a collision. Therefore, there is no need to provide decoupling in the longitudinal adjustment device.

In the first embodiment, the energy is reduced mainly by the fact that the displacement body moves along the slit, when the force-limiting device is subjected to a force above a predefined force threshold value, and in so doing deforms the material surrounding the slit, wherein kinetic energy is converted into deformation energy.

In a second, alternative embodiment, provision is made that the longitudinal adjustment device is provided between the seat-mounted guide element and a force-limiting device, which has a force-limiting element coupled on the one hand to the longitudinal adjustment device and on the other hand to the vehicle-mounted guide element, wherein the force-limiting element has a first friction body, which is coupled to the longitudinal adjustment device, and a second friction body, which is coupled to the vehicle-mounted guide element, wherein the two friction bodies are in frictional engagement with each other and are designed to move relative to each other with friction when they are subjected to a relative force above a predefined force threshold value.

In a third, alternative embodiment, provision is made that the longitudinal adjustment device is provided between the seat-mounted guide element and a force-limiting device, which has a force-limiting element coupled on the one hand to the longitudinal adjustment device and on the other hand to the vehicle-mounted guide element, wherein the force-limiting element has a first cutting body, which is coupled to the longitudinal adjustment device, and a second cutting body, which is coupled to the vehicle-mounted guide element, wherein the two cutting bodies are designed to come into cutting engagement with each other and move in a cutting motion relative to each other when acted upon by a relative force above a predefined force threshold value.

In the first embodiment, it is advantageous if the deformation portion is made of or has a plastically deformable material or alternatively an elastically deformable material.

In all embodiments, the longitudinal adjustment device preferably has a spindle shaft and a spindle nut in threaded engagement with the latter. The self-locking property in the longitudinal adjustment device is provided by the self-locking inherent to a spindle drive of this kind.

In a first type of advantageous embodiment of the invention, the deformation portion has a bent, undulating or folded configuration. The kinetic energy is preferably reduced here by stretching or compression of the deformation portion and converted into deformation energy.

The invention also relates to a vehicle seat having a vehicle seat console according to the invention.

The invention is additionally directed to a motor vehicle having at least one vehicle seat according to the invention.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
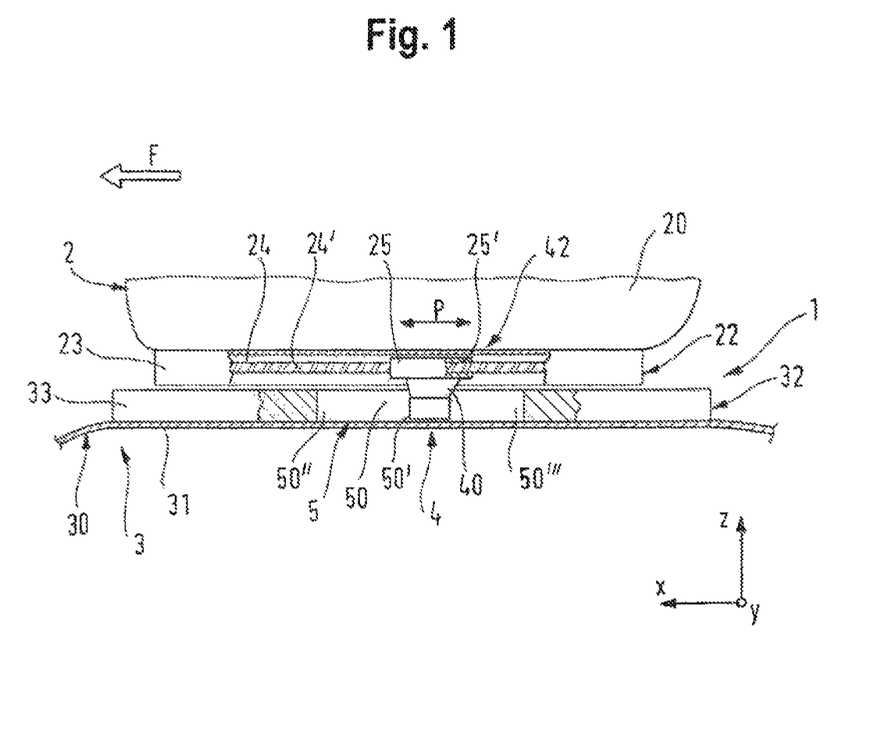
FIG. 1 is a schematic side view of a vehicle seat console as is also provided in the invention.

FIG. 1 shows a vehicle seat console 1 in a schematic and partially sectioned side view. The vehicle seat console 1 connects a vehicle seat 2 to the chassis 30 of a vehicle 3. For this purpose, the vehicle seat console 1 has left-hand and right-hand, upper and lower guide elements which are oriented in the longitudinal direction x of the vehicle and of which only the left-hand guide elements are shown in FIG. 1; the right-hand guide elements are correspondingly configured and, in order to avoid repetition, are therefore not described any further.

The lower, vehicle-mounted guide element 32 has a lower guide rail 33, which is connected rigidly to the vehicle floor 31 and which extends substantially parallel to the longitudinal direction x of the vehicle. An upper guide rail 23, which is fitted on the seat base 20 of the vehicle seat 2, is in customary sliding engagement with this lower guide rail 33. The upper guide rail 23 forms an upper, seat-mounted guide element 22. An upper and a lower sliding surface, which are not specifically shown in the figures or described and are advantageously provided or coated with a lubricant, are formed between the lower guide rails 33 and the upper guide rail 23. Instead of the sliding surfaces, it is also possible to provide a rolling bearing, for example a ball bearing.

A spindle shaft 24 is mounted fixedly within or alongside the upper guide rail 23, which spindle shaft 24 extends substantially over the length of the upper guide rail 23 and is provided with an outer thread 24'. Mounted on the spindle shaft 24 is a spindle nut 25, which has an inner thread 25' in engagement with the outer thread 24', such that the spindle shaft 24 (and with it the vehicle seat 2) can move parallel to the longitudinal direction of the guide elements 22, 32, i.e. in the installed state of the vehicle seat 2 parallel to the longitudinal direction x of the vehicle, through rotation of the spindle nut 25, which in normal operation is stationary with respect to the longitudinal direction x of the vehicle.

The spindle nut 25 is connected to a force-limiting device 5 and is there mounted rotatably in or on a first region 50' of a force-limiting element 50 extending substantially parallel to the longitudinal direction of the guide elements 22, 32, i.e. in the installed state of the vehicle seat parallel to the longitudinal direction x of the vehicle. The force-limiting device 5 is in turn connected to the vehicle-mounted guide element 32, for which purpose, in the example shown, a second region 50" and a third region 50''' of the force-limiting element 50 are mounted on the vehicle floor 31 or on the lower guide rail 33. A deformation portion 52 (FIG. 2 to FIG. 7) of the force-limiting element 50 extends between the first region 50' and the second region 50" and/or the third region 50''' of the force-limiting element 50. This deformation portion 52 is designed such that it deforms when acted upon by a force above a predefined force threshold value. Such a deformation leads to a displacement of the first region 50' relative to the second and third region 50", 50''' of the force-limiting element 50 and thus to a shift of the spindle nut 25 relative to the lower guide rail 33 or to the vehicle floor 31 in the longitudinal direction x of the vehicle.

A seat adjustment mechanism 4 is arranged on the vehicle floor 31, on the force-limiting device 5 or on the lower guide rail 33. This seat adjustment mechanism 4 has a drive device 40, for example an electric motor, which is coupled by a drive shaft (not shown) to the spindle nut 25 for torque transmission and applies a driving force to said spindle nut 25. A rotation of the drive shaft, generated by the drive device 40, gives rise to a rotation of the spindle nut 25, on account of which the spindle shaft 24 then migrates forward in the direction of travel F, or rearward in the opposite direction, and carries the vehicle seat 2 along in this direction, as is symbolized by the double arrow P in FIG. 1, in order to effect a desired adjustment of the seat.

The lower guide rail 33, the upper guide rail 23, the spindle shaft 24 and the spindle nut 25 in this way form a longitudinal adjustment device 42 for the vehicle seat 2. By virtue of the spindle drive, the longitudinal adjustment device 42 forms a self-locking translatory movement unit, which has the effect that in normal circumstances the vehicle seat 2 cannot accidentally move under the application of external forces.

In the event of the vehicle 3 colliding relatively severely with an obstacle or another vehicle such that the collision force has a substantial component in the longitudinal direction x of the vehicle, the vehicle 3 is accelerated positively (rear-end impact) or negatively (frontal impact) by the sudden collision force. In this acceleration, the vehicle seat 2 with the person sitting on it, on account of the inertial mass of this person and of the vehicle seat 2, seeks initially to maintain the original speed, whereas the vehicle 3 undergoes the change of speed triggered by the collision-induced acceleration. As a result, the vehicle-mounted guide elements, which are rigidly connected or coupled to the vehicle chassis 30, and the seat-mounted guide elements, which are connected or coupled to the vehicle seat 2, seek to move relative to each other on account of the collision-induced forces. These forces acts on the deformation portion 52 of the force-limiting element 50 of the force-limiting device 5 and deform it, as a result of which a braked relative movement of the vehicle seat 2 with respect to the vehicle chassis 30 is permitted. Consequently, the collision acceleration caused by the collision impact is attenuated by the deforming of the deformation portion 52, and therefore the level of acceleration acting on the vehicle seat 2 and on the person sitting on it is lower than the collision acceleration. Some of the kinetic energy of the vehicle seat 2 with the person sitting on it is therefore converted into deformation energy.

The structure and the function of various force-limiting devices is explained in more detail below with reference to FIGS. 2 to 7, wherein the figures each depict only a schematic representation of the structure of the respective force-limiting device 5. Moreover, the attachment of the force-limiting device 5 to the vehicle-mounted guide element 32 or to the vehicle floor 31 and the attachment of the spindle nut 25 to the force-limiting device 5 are shown only schematically. The direction of travel F of the vehicle, hence the position of installation of the force-limiting device 5 into the vehicle seat console 1, is likewise indicated in each of the figures.

Figure 2:
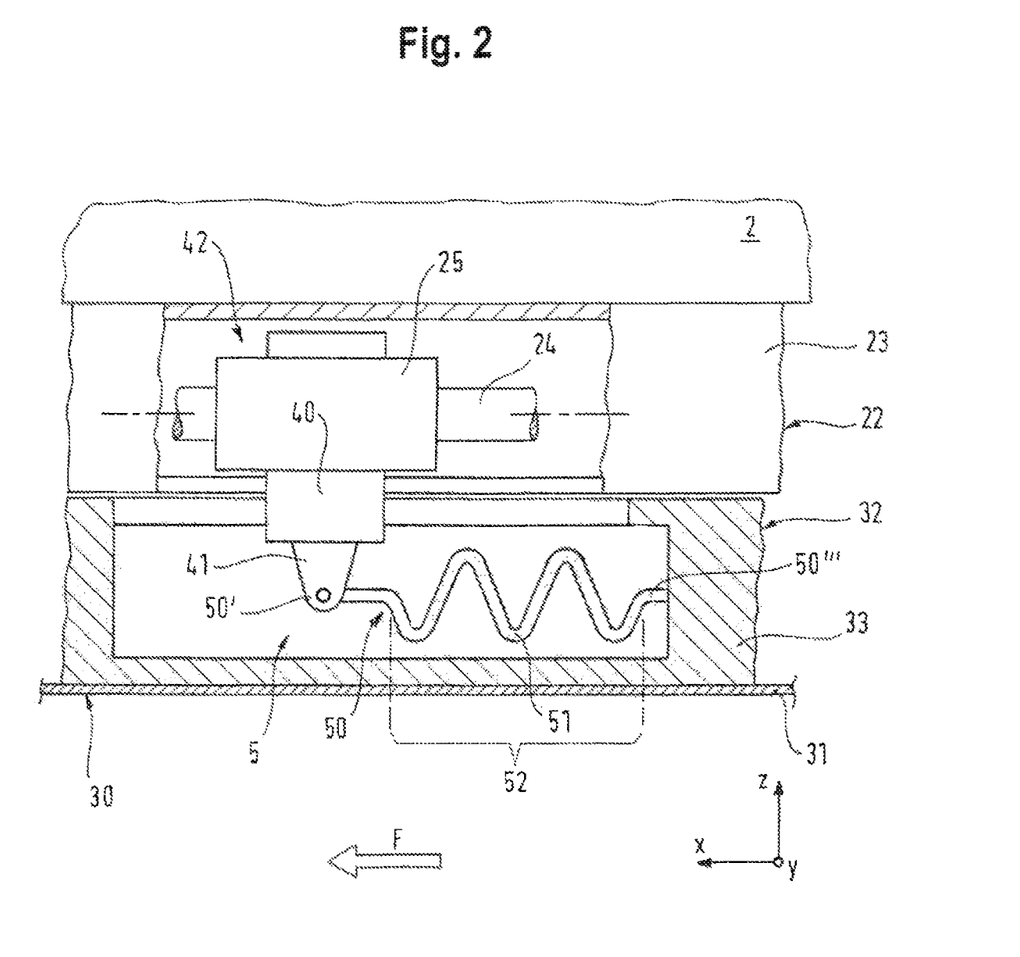
FIG. 2 is an embodiment of a force-limiting device with a deformation portion that is plastically deformable by stretching under tensile forces.

FIG. 2 shows a first type of force-limiting device 5 which has, as force-limiting element 50, a tie rod 51 which has undulating folds and whose undulating region forms the deformation portion 52 of the force-limiting element 50. The force-limiting element 50 is mounted, via a region 50' at one end thereof, on a support part 41 which supports the drive device 40 and which rotatably mounts the spindle nut 25, and it is rigidly connected, via a region 50''' at its other end, to the lower guide rail 33 of the vehicle-mounted guide element 32. If, in the event of a frontal collision where the vehicle chassis 30 is suddenly decelerated on account of the collision forces, the vehicle seat 2 seeks to move onward in the direction of travel F, the undulating deformation portion 52 is stretched, whereas the vehicle seat 2 moves onward in the direction of travel F. Through the resulting deformation of the undulating deformation portion 52, kinetic energy of the vehicle seat 2 is converted into deformation energy and the vehicle seat 2 is braked, such that the abrupt collision forces acting on the vehicle seat 2 are attenuated.

Figure 3:
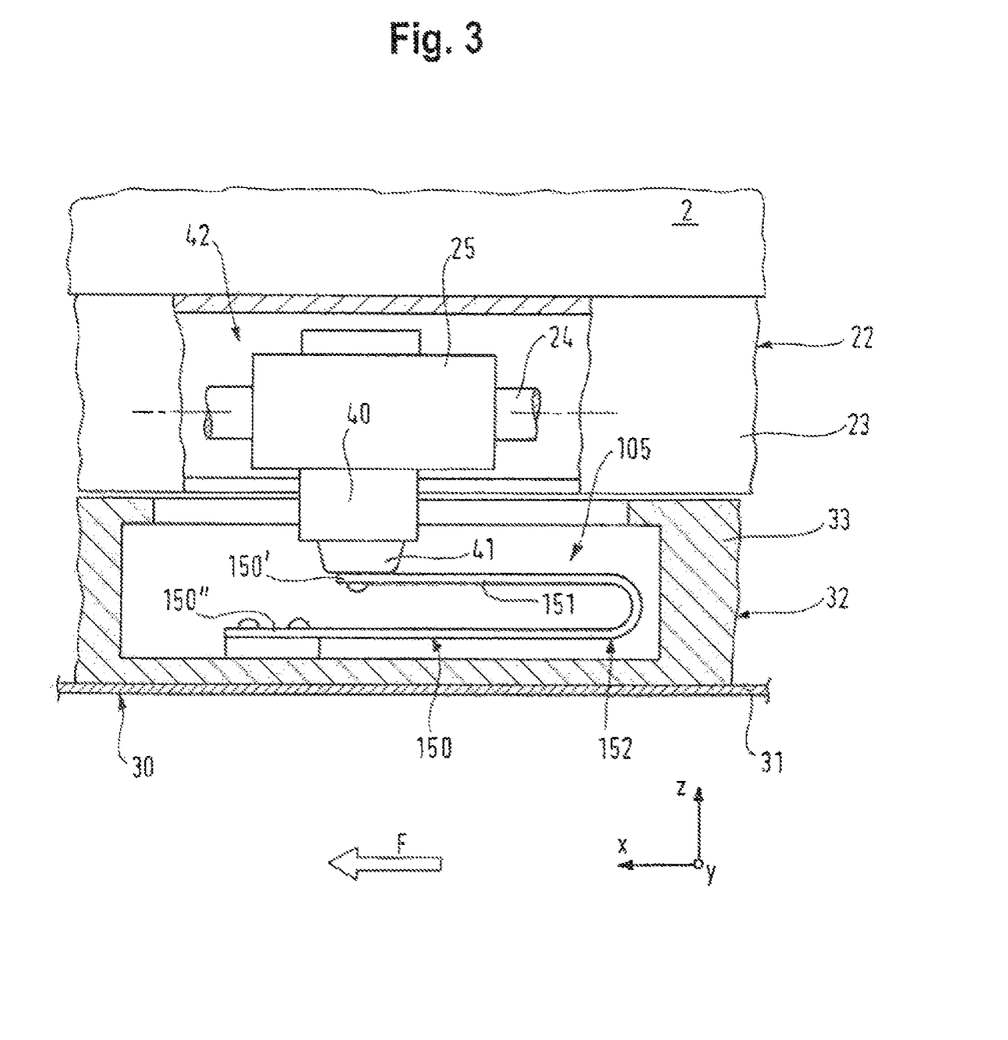
FIG. 3 is a further embodiment of a force-limiting device with a deformation portion that is plastically deformable by bending under tensile forces.

FIG. 3 shows a second type of force-limiting device 105 which has, as force-limiting element 150, a tie rod 151 bent through 180°, where the region surrounding the region bent back through 180° forms the deformation portion 152 of the force-limiting element 150. The force-limiting element 150 is mounted, via a region 150' at one end thereof, on a support part 41 which supports the drive device 40 and which rotatably mounts the spindle nut 25, and it is rigidly connected, via a region 150'' at its other end, to the lower guide rail 33 of the vehicle-mounted guide element 32. If, in the event of a frontal collision where the vehicle chassis 30 is suddenly decelerated on account of the collision forces, the vehicle seat 2 seeks to move onward in the direction of travel F, the deformation portion 152 is deformed in such a way that the 180° curvature of the tie rod 151 migrates along the deformation portion 152. The portion of the 180° curvature of the tie rod 151 facing toward the support part 41 is stretched, and its portion for arrangement on the lower guide rail 33 is curved, as a result of which kinetic energy is in each case converted into deformation energy.

Figure 4:
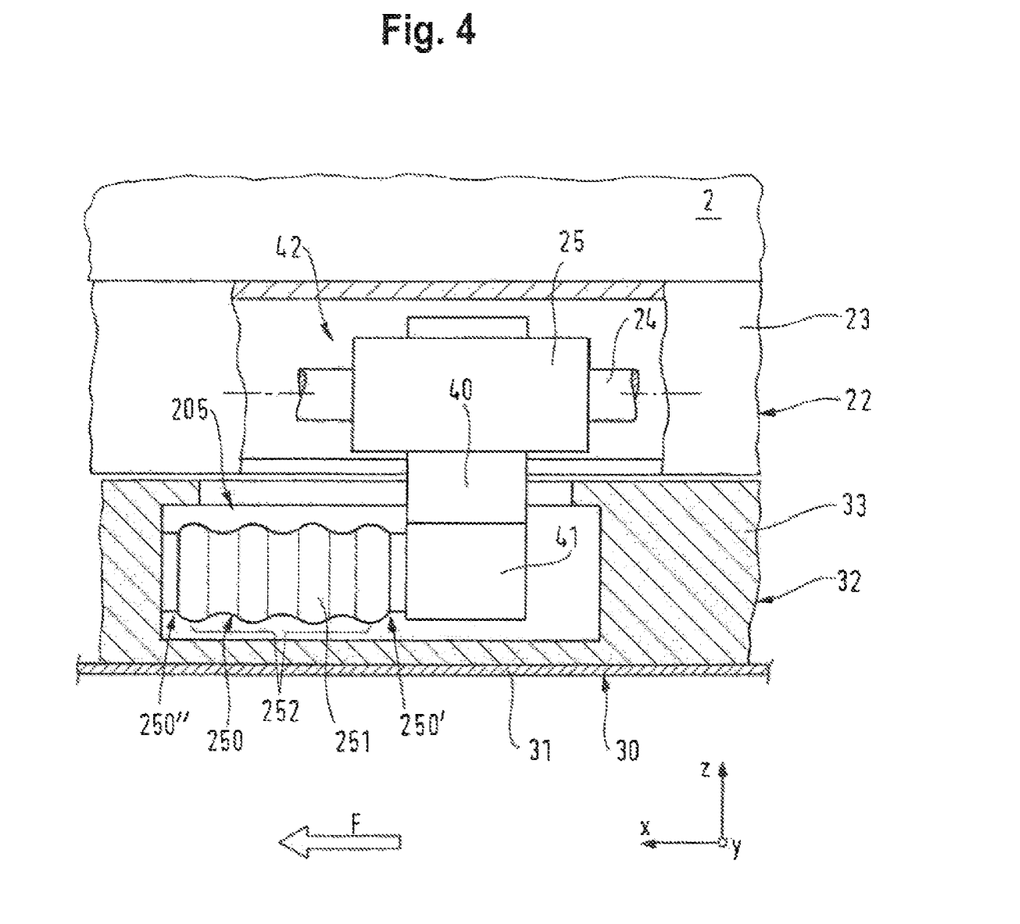
FIG. 4 is a third embodiment of a force-limiting device with a deformation portion that is plastically deformable by compression under pressure forces.

FIG. 4 shows a third type of force-limiting device 205 which has, as force-limiting element 250, a folded hollow body 251 whose circumferential wall is folded or corrugated along the longitudinal extent in the manner of an accordion or bellows and thus forms the deformation portion 252 of the force-limiting element 250. The force-limiting element 250 is mounted, via a region 250' at one end thereof, on the support part 41 which supports the drive device 40 and which rotatably mounts the spindle nut 25, and it is rigidly connected, via a region 250''' at its other end, to the lower guide rail 33 of the vehicle-mounted guide element 32. If, in the event of a frontal collision where the vehicle chassis 30 is suddenly decelerated on account of the collision forces, the vehicle seat 2 seeks to move onward in the direction of travel F, the deformation portion 252 is compressed in the manner of a bellows that has been pushed together, as a result of which kinetic energy is converted into deformation energy.

Figure 5:
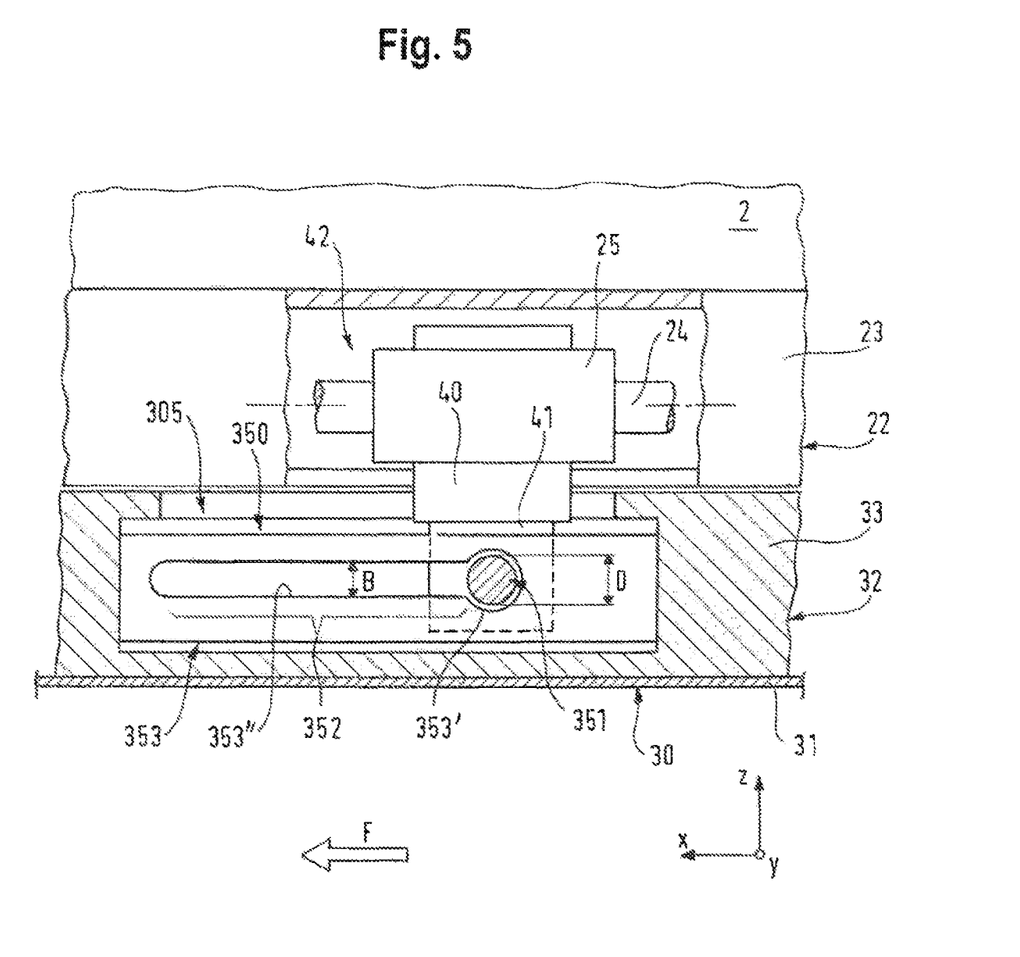
FIG. 5 is a first embodiment of a force-limiting device according to the invention with a displacement body which interacts with a slit-like deformation portion.

FIG. 5 shows, as a first embodiment of the invention, a fourth type of force-limiting device 305 which has, as force-limiting element 350, a combination of a displacement body 351 and of a deformation body 353 with a through-opening 353' and a slit which originates from the latter and forms the deformation portion 352. The displacement body 351, for example a bolt, is mounted on the support part 41 which supports the drive device 40 and which rotatably mounts the spindle nut 25, and it engages in the through-opening 353'. The deformation portion 353 having the slit 353" is rigidly connected to the lower guide rail 33 of the vehicle-mounted guide element 32. If, in the event of a frontal collision where the vehicle chassis 30 is suddenly decelerated on account of the collision forces, the vehicle seat 2 seeks to move onward in the direction of travel F, the deformation body 353 is moved toward the displacement body 351, wherein the latter is forced into the slit 353" and widens the slit 353", as a result of which kinetic energy is converted into deformation energy.

Figure 6:
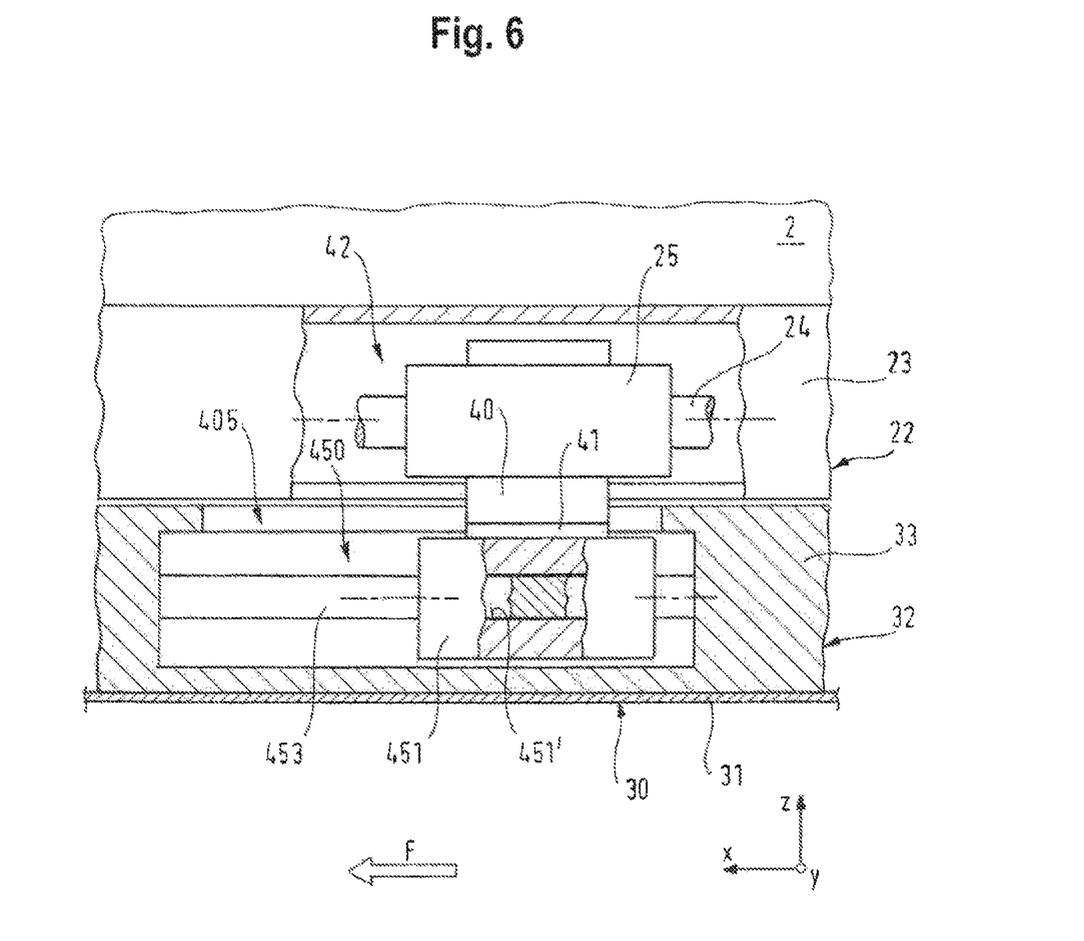
FIG. 6 is a second embodiment of a force-limiting device according to the invention which has two friction bodies in engagement with each other.

FIG. 6 shows, as a second embodiment of the invention, a fifth type of force-limiting device 405 which has, as force-limiting element 450, a combination of a first, outer friction body 451 with an axial through-opening 451' and of a second, inner friction body 453, wherein the inner friction body 453 engages in the axial through-opening 451' to form a frictional connection at the mutual contact surfaces of the friction bodies 451, 453. The first, outer friction body 451 is mounted on the support part 41 which supports the drive device 40 and which rotatably mounts the spindle nut 25, and the second, inner friction body 453 is rigidly connected to the vehicle-mounted guide element 32. If, in the event of a frontal collision where the vehicle chassis 30 is suddenly decelerated on account of the collision forces, the vehicle seat 2 seeks to move onward in the direction of travel F, the outer friction body 451 is pulled along the inner friction body 453, wherein the inner wall of the axial through-opening 451' of the outer friction body 451 is moved along the outer wall of the inner friction body 453. The mutually touching surfaces of the friction bodies 451, 453 rub against each other, as a result of which kinetic energy is converted into frictional heat.

Figure 7:
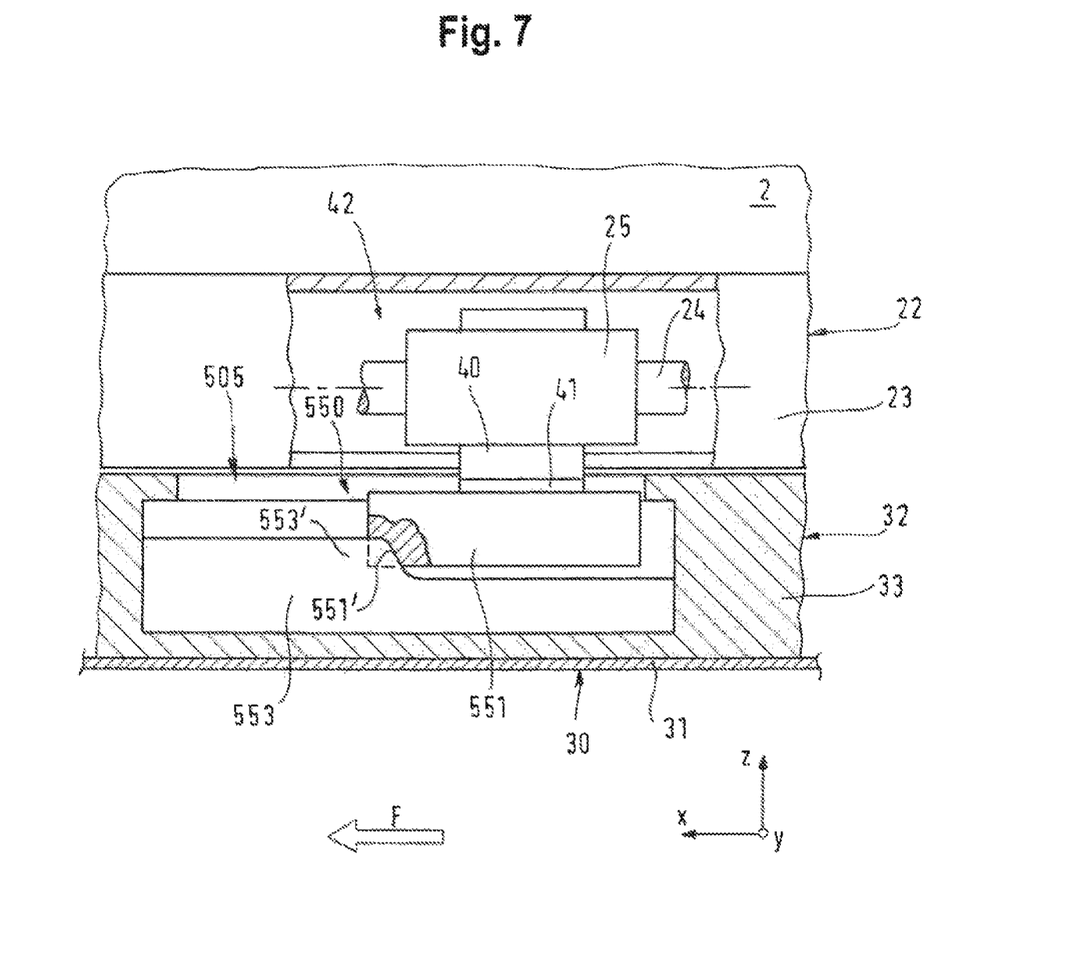
FIG. 7 is a third embodiment of a force-limiting device according to the invention which has two cutting bodies in engagement with each other.

FIG. 7 shows, as a third embodiment of the invention, a sixth type of force-limiting device 505 which has, as force-limiting element 550, a combination of a first cutting body 551 and a second cutting body 553. The first cutting body 551 is mounted on the support part 41, and the second cutting body 553 is rigidly connected to the lower guide rail 33 of the vehicle-mounted guide element 32. The second cutting body 553 has a cutting blade 553' which, with a portion to the rear as seen in the direction of movement (direction of travel), engages in a cutting notch 551' of the first cutting body 551. At least in its lower region facing toward the second cutting body 553, the first cutting body 551 has a material that can be cut by the cutting blade 553'. If, in the event of a frontal collision where the vehicle chassis 30 is suddenly decelerated on account of the collision forces, the vehicle seat 2 seeks to move onward in the direction of travel F, the first cutting body 551 is moved relative to the cutting blade 553' of the second cutting body 553 and, starting from the cutting notch 551', cuts farther into the material of the cutting portion of the first cutting body 551. In this way, kinetic energy is transferred into free surface.

Of course, in the variants of FIGS. 5 to 7, it is also possible for the two parts of the respective force-limiting element to be changed around, without thereby modifying the functionality and departing from the inventive concept.

The invention is not restricted to the illustrative embodiments above, which serve merely to give a general explanation of the core concept of the invention. Rather, in line with the scope of protection, the device according to the invention can also take on configurations other than those described above. In particular, the device here can have features which constitute a combination of the respective individual features of the claims.

Reference signs in the claims, in the description and in the drawings serve merely to give a better understanding of the invention and are not intended to limit the scope of protection.

LIST OF REFERENCE SIGNS

1 vehicle seat console
2 vehicle seat
3 vehicle
4 seat adjustment mechanism
5 force-limiting device
20 seat base
22 upper, seat-mounted guide element
23 upper guide rail
24 spindle shaft
24' outer thread
25 spindle nut
25' inner thread
30 chassis
31 vehicle floor
32 lower, vehicle-mounted guide element
33 lower guide rail
40 drive device
41 support part
42 longitudinal adjustment device
50 force-limiting element
50' first region
50'' second region
50''' third region
51 tie rod
52 deformation portion
105 force-limiting device
150 force-limiting element
150' region
150'' region
151 tie rod
152 deformation portion
205 force-limiting device
250 force-limiting element
250' region
250'' region
251 hollow body
252 deformation portion
350 force-limiting element
351 displacement body
352 deformation portion
353 deformation body
353' through-opening
353'' slit
405 force-limiting device
450 force-limiting element
451 first, outer friction body
451' through-opening
453 second, inner friction body
505 force-limiting device
550 force-limiting element
551 first cutting body
551' cutting notch
553 second cutting body
553' cutting blade
x longitudinal direction of vehicle
F direction of travel
P double arrow The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat console, comprising:
   at least one vehicle-mounted guide element and at least one seat-mounted guide element which is arranged parallel to the vehicle-mounted guide element;
   at least one longitudinal adjustment device, which is activated by a drive device and is configured to effect a relative adjustment between the vehicle-mounted guide element and the seat-mounted guide element; and
   a force-limiting device, wherein
   the longitudinal adjustment device is provided between the seat-mounted guide element and the force-limiting device, which has a force-limiting element coupled on the one hand to the longitudinal adjustment device and on the other hand to the vehicle-mounted guide element,
   the force-limiting element has a deformation portion which has a through-opening with a slit originating therefrom and extending in the longitudinal direction of the force-limiting device, the force-limiting element has a displacement body, which extends through the through-opening, a thickness of the displacement body being greater than a width of the slit, the width of the slit is initially constant along the longitudinal direction, and the deformation portion deforms when acted upon by a force above a predefined force threshold value, the force being generated when the displacement body is forced into the slit along the longitudinal direction and widens at least a portion of the slit.

2. The vehicle seat console according to claim 1, wherein the deformation portion is made of or has a plastically deformable material or an elastically deformable material.

3. The vehicle seat console according to claim 1, wherein the longitudinal adjustment device has a spindle shaft and a spindle nut in meshing engagement with the latter.

4. The vehicle seat console according to claim 2, wherein the longitudinal adjustment device has a spindle shaft and a spindle nut in meshing engagement with the latter.

5. A vehicle seat comprising the vehicle seat console according to claim 1.

6. A vehicle seat comprising the vehicle seat console according to claim 2.

7. A motor vehicle comprising at least one vehicle seat according to claim 5.

8. A motor vehicle comprising at least one vehicle seat according to claim 6.

\* \* \* \* \*